(12) United States Patent
Brok

(10) Patent No.: US 10,870,399 B2
(45) Date of Patent: Dec. 22, 2020

(54) SENSOR ARRANGEMENT FOR A MOTOR VEHICLE, MOTOR VEHICLE AND METHOD FOR OPERATING A SENSOR DEVICE

(71) Applicant: Audi AG, Ingolstadt (DE)

(72) Inventor: Tobias Brok, Kösching (DE)

(73) Assignee: AUDI AG, Ingolstadt (DE)

( * ) Notice: Subject to any disclaimer, the term of this patent is extended or adjusted under 35 U.S.C. 154(b) by 275 days.

(21) Appl. No.: 15/962,942

(22) Filed: Apr. 25, 2018

(65) Prior Publication Data

US 2018/0312116 A1   Nov. 1, 2018

(30) Foreign Application Priority Data

Apr. 26, 2017  (DE) .......................... 10 2017 207 024

(51) Int. Cl.
  *B60R 11/04*  (2006.01)
  *B60S 1/02*  (2006.01)
  (Continued)

(52) U.S. Cl.
  CPC ............... *B60R 11/04* (2013.01); *B60S 1/023* (2013.01); *G01S 7/4813* (2013.01);
  (Continued)

(58) Field of Classification Search
  CPC .. B60R 11/04; B60R 2011/0026; B60S 1/023; G01S 2007/4977; G01S 17/931;
  (Continued)

(56) References Cited

U.S. PATENT DOCUMENTS 9,635,229 B2    4/2017  Wato
9,913,319 B2 *  3/2018  Timmermann .......... H05B 3/10
(Continued)

FOREIGN PATENT DOCUMENTS

DE    10 2005 055 349 A1    5/2007
DE       102007035905 A1    2/2009
(Continued)

OTHER PUBLICATIONS

English-language Abstract of German Patent Application Publication No. DE 102007035905 A1, published Feb. 5, 2009; 1 page.
(Continued)

*Primary Examiner* — Dana Ross
*Assistant Examiner* — Joe E Mills, Jr.
(74) *Attorney, Agent, or Firm* — Sterne, Kessler, Goldstein & Fox P.L.L.C.

(57) ABSTRACT

The invention relates to a sensor arrangement for a motor vehicle, with a pane, a sensor housing, and an optical sensor, wherein the sensor housing is arranged on one side of the pane such that between the sensor housing and the pane, a gap is formed, in which the optical sensor is arranged. To allow for a deicing of the pane in an area of the sensor housing in a particularly simple and thus cost-effective manner, it is provided that between the sensor housing and the side of the pane, a heat conducting element is arranged to conduct heat from outside the sensor housing in between the sensor housing and the pane.

20 Claims, 2 Drawing Sheets

(51) Int. Cl.
*G03B 17/55* (2006.01)
*G01S 7/481* (2006.01)
*G01S 17/931* (2020.01)
*H04N 5/225* (2006.01)
*B60R 11/00* (2006.01)
*G01S 7/497* (2006.01)

(52) U.S. Cl.
CPC .......... *G01S 17/931* (2020.01); *G03B 17/55* (2013.01); *B60R 2011/0026* (2013.01); *G01S 2007/4977* (2013.01); *H04N 5/2252* (2013.01)

(58) Field of Classification Search
CPC ..... G01S 17/936; G01S 7/4813; G03B 17/55; H04N 5/2252
See application file for complete search history.

(56) References Cited

U.S. PATENT DOCUMENTS

| | | |
|---|---|---|
| 9,961,240 B2 | 5/2018 | Wato |
| 2014/0073013 A1* | 3/2014 | Gorman ................ B01L 7/52 435/91.2 |
| 2015/0256729 A1* | 9/2015 | Wato ...................... B60R 11/04 348/311 |
| 2016/0344977 A1 | 11/2016 | Murao |
| 2016/0375828 A1 | 12/2016 | Yun |

FOREIGN PATENT DOCUMENTS

| | | |
|---|---|---|
| DE | 202009018502 U1 | 2/2012 |
| DE | 102015204276 A1 | 9/2015 |
| DE | 10 2015 220 575 A1 | 4/2016 |
| DE | 102014220431 A1 | 4/2016 |
| DE | 10 2016 208 771 A1 | 11/2016 |
| EP | 1605729 A2 | 12/2005 |
| WO | WO 2013/131700 A1 | 9/2013 |

OTHER PUBLICATIONS

English-language Abstract of German Patent Application Publication No. DE 202009018502 U1, published Feb. 9, 2012; 2 pages.
English-language Abstract of German Patent Application Publication No. DE 102014220431 A1, published Apr. 14, 2016; 2 pages.

* cited by examiner

SENSOR ARRANGEMENT FOR A MOTOR VEHICLE, MOTOR VEHICLE AND METHOD FOR OPERATING A SENSOR DEVICE

TECHNICAL FIELD

This disclosure relates to a sensor arrangement for a motor vehicle with a pane, a sensor housing, and an optical sensor. The sensor housing is arranged on one side of the pane such that between the sensor housing and the pane, a gap is formed, in which the optical sensor is arranged. This disclosure further relates to a motor vehicle with such a sensor arrangement, and a method for operating a sensor arrangement for a motor vehicle.

BACKGROUND

Driver assistance systems for assisting a driver of a motor vehicle are becoming increasingly more efficient and independent. The objective is to increase the safety during the driving of the motor vehicle by early recognition of dangerous situations and interference in the driving of the motor vehicle or warning of the driver. For the operation of a driver assistance system, sensors, for example, cameras, Lidar sensors, or infrared sensors, are frequently provided for supplying the driver assistance system with environmental information.

DE 10 2014 220 431 A1 provides a method for removing weather-related deposits, particularly moisture, on a camera observation window for a camera of a vehicle. In this case, the camera and a radar sensor form an assembly, and by means of the radar sensor, a radar radiation is generated with a frequency that corresponds to an excitation frequency of water molecules.

To prevent an optical sensor, which is arranged behind a pane, from becoming non-operational due to condensation or ice on the pane, EP 1 605 729 A 2 provides an electrically heatable pane, on which the optical sensor can be arranged. For that purpose, an entry surface of the window, through which an optical signal impinges on the optical sensor, is coated with an electrically conducting film.

The idea of preventing icing or condensation of the pane by means of electrical heating is developed by DE 10 2007 035 905 A1. It discloses that a capacitive sensor is designed both for detecting moisture and for heating the pane.

Generally, electrical or active means for heating the pane are activated only after the ignition of the motor vehicle is switched on and thus shortly before departure. It can thus not be ensured that the pane is free of ice or condensation in time before taking off.

BRIEF DESCRIPTION OF THE DRAWINGS/FIGURES

The accompanying drawings, which are incorporated herein and form part of the specification, illustrate the present embodiments and, together with the description, further serve to explain the principles of the present embodiments and to enable a person skilled in the relevant art(s) to make and use the present embodiments.

Figure 1:
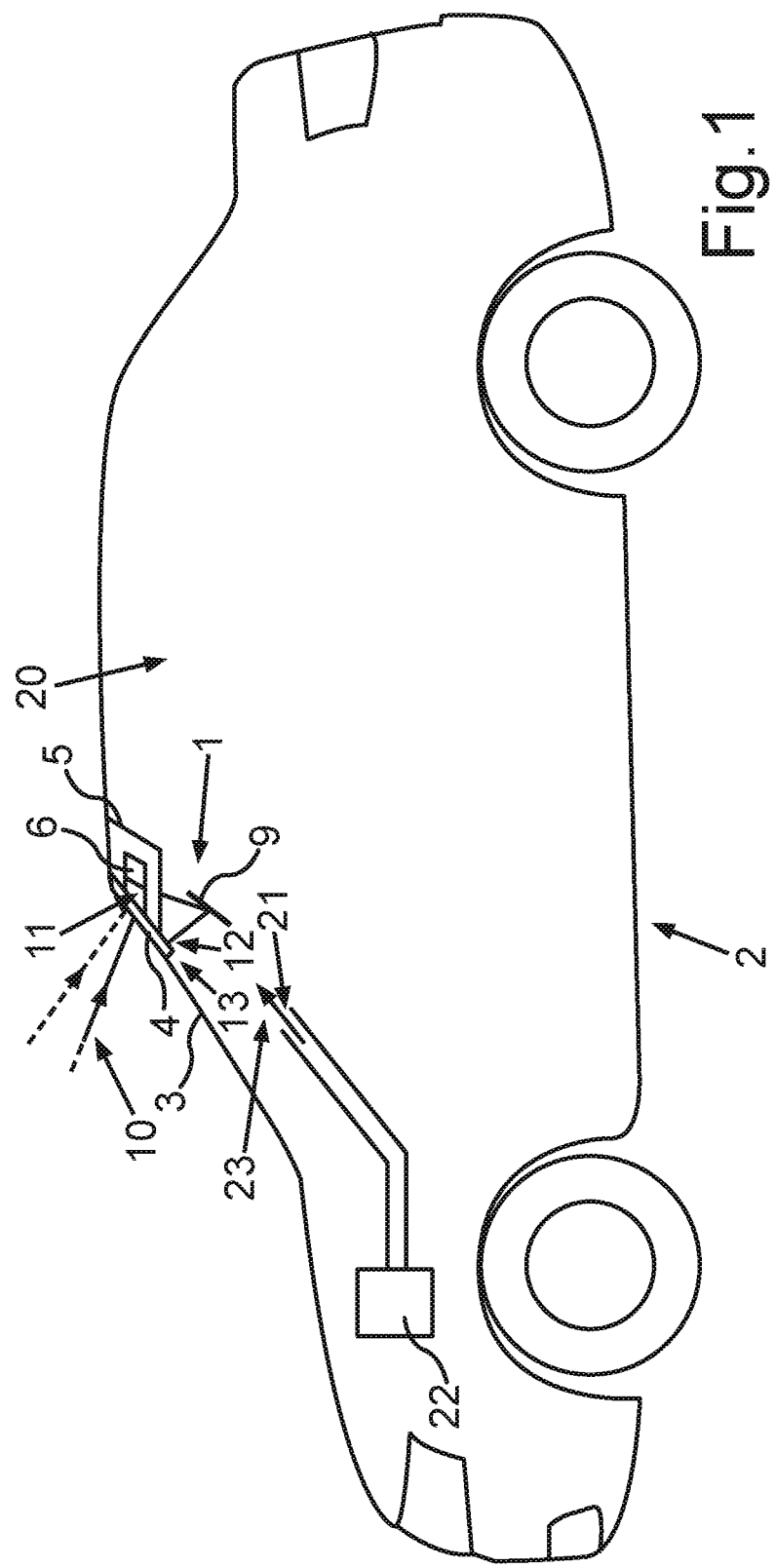
FIG. 1 illustrates a schematic side view of a motor vehicle with a sensor arrangement, according to some embodiments.

The features and advantages of the present embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The problem addressed by this disclosure is that of providing a deicing of the pane in an area of the sensor housing in a particularly simple and thus cost-effective manner.

This disclosure is based on the realization that due to the arrangement of the sensor housing on the pane, a sufficient air circulation for heating the pane in the area of the optical sensor is not possible. If the pane is, for example, a windshield, warm air from a blower for deicing the windshield cannot or only insufficiently circulate around the pane in the area of the optical sensor. This disclosure solves the problem with a heat conducting element that is arranged on the same side of the pane as the optical sensor. The heat conducting element is suitable to conduct heat from an interior of the motor vehicle to the area of the pane, in which the optical sensor is arranged, particularly into the gap between the pane and the optical sensor. The interior of the motor vehicle can be heated prior to departure particularly by means of an independent vehicle heater. The heat conducting element thus allows particularly for an indirect deicing of the pane in the area of the optical sensor by means of the independent vehicle heater.

The sensor arrangement for the motor vehicle thus comprises the pane, a sensor housing, and an optical sensor, wherein the sensor housing is arranged on one side of the pane such that between the sensor housing and the pane, a gap is formed, in which the optical sensor is arranged. The pane is preferably a windshield or a rear window of the motor vehicle. The optical sensor is preferably designed as a camera, Lidar sensor, or infrared sensor. The sensor is preferably arranged such that an optical signal impinges through the pane at first into the gap and subsequently onto the sensor.

To make the deicing of the pane possible in a particularly simple and cost-effective manner, it is provided, according to some embodiments, that a heat conducting element is arranged between the sensor housing and the side of the pane to conduct heat from outside the sensor housing in between the sensor housing and the pane. For example, the heat conducting element can be arranged on the same side of the pane as the sensor housing. The heat element can be designed to conduct heat from outside the sensor housing to the area of the pane, in which the sensor housing is arranged on the pane. The heat conducting element can interlock with the pane and/or be held force-locked between pane and sensor housing. Preferably, the heat conducting element is designed so as to be passive; for example, it cannot be heated electrically. The entire sensor device preferably has no heating element, to which an electric voltage can be applied purely for heating purposes.

It is particularly provided that a material, preferably metal, from which the heat conducting element is formed, has a greater thermal conduction coefficient than a material from which the pane is formed. As a result, the heat conduction from outside the housing to the gap or in between the sensor housing and the pane can be improved by the heat conducting element, when compared to the heat conduction solely by the pane. Preferably, the heat conducting element can be formed at least to some extent from metal. Metal allows for a particularly simple and/or efficient processing of the heat conducting element at simultaneously high heat conductivity.

Some embodiments provide that the heat conducting element can be non-transparent. It can therefore be prevented, for example, that the optical signal passes through the heat conducting element. As a result, for example, a detection range of the optical sensor can be restricted. The heat conducting element thus can have the double function of defining the detection range of the optical sensor and deicing the pane through heat conduction.

Some embodiments provide that the heat conducting element is designed as a privacy screen, which can partially prevent a view through the pane. For example, the heat conducting element can be opaque. For that purpose, the heat conducting element can be non-transparent for light in the spectral range visible to humans. The heat conducting element can therefore be arranged on the pane as a decoration. In addition, the heat conducting element can be designed so as to conceal, at least to some extent, the gap and/or the camera housing from view.

Some embodiments provide that the heat conducting element can be applied to the side of the pane by means of thermal evaporation. For example, the heat conducting element can be applied by means of thermal evaporation to the side of the pane on which the sensor housing is arranged. The heat conducting element can thus be arranged on the pane by means of thermal evaporation in a particularly simple manner. Thermal evaporation of the heat conducting element is particularly advantageous in case of a metallic heat conducting element.

Some embodiments provide that the gap is sealed by the sensor housing, the pane, and the heat conducting element. For example, the optical sensor arranged in the gap can be separated from an area outside of the sensor housing. As a result, no air exchange between the gap and the area outside of the sensor housing can take place. It can thus be prevented that moisture from the area outside of the sensor housing, for example, from the interior of the motor vehicle, condenses on the pane in the area of the optical sensor. However, due to the heat conducting element, transport of heat from outside of the housing into the gap or the pane in the area of the optical sensor is still possible.

Some embodiments provide that the optical sensor can be designed to detect an optical signal, particularly light that impinges through the entry surface of the pane onto the optical sensor, wherein the entry surface is not covered by the heat conducting element. In particular, the entry surface may not be covered by the heat conducting element to ensure a particularly high detection quality of the optical signal by the optical sensor. Particularly in this case, the heat conducting element can be non-transparent, and the detection range of the optical sensor can be predefined by the size, shape, and position of the entry surface. In addition, the entry surface can be so small that it is deiced despite not being covered by the heat conducting element, for example, due to the low heat conductivity of the pane.

Some embodiments provide that the entry surface can have a further, transparent heat conducting element. In particular, the further transparent heat conducting element can be arranged in the area not covered by the heat conducting element. Therefore, the entry surface can also be thermally coupled with the further transparent heat conducting element. As a result, the pane in the area of the housing can be deiced particularly well.

A second aspect of this disclosure relates to a motor vehicle with a sensor arrangement of the type described above. Hereto, the sensor housing with the optical sensor, relative to the motor vehicle, can be arranged on an inner side of the pane. The heat conducting element can therefore be arranged on the inner side on the pane. The optical signal can impinge from a surrounding of the motor vehicle through the entry surface onto the sensor. In particular, the heat conducting element can be designed to conduct heat from an interior of the motor vehicle in between the pane and the sensor housing. For example, the heat conducting element can be designed to conduct heat from the interior of the motor vehicle in the area of the sensor housing into the pane. Alternatively, the heat conducting element can be designed to conduct heat from the interior of the motor vehicle into the gap between sensor housing and pane. For example, the heat from the interior of the motor vehicle can be generated by a ventilation, a blower, and/or an independent vehicle heater of the motor vehicle.

A third aspect of this disclosure relates to a method for operating a sensor arrangement for a motor vehicle, wherein a sensor housing of the sensor arrangement is arranged on one side of the pane such that between the sensor housing and the pane, a gap is formed, in which the optical sensor is arranged. In some embodiments, heat can be conducted from an interior of the motor vehicle by means of a heat conducting element specifically provided for heat conduction in between the sensor housing and the pane. In particular, the embodiments of the method for operating the sensor arrangement and/or the motor vehicle include, for example, the embodiments of refers to the sensor arrangement described above and/or the motor vehicle described above.

This disclosure includes specific embodiments of the method disclosed herein having features including the embodiments of the sensor arrangement or the motor vehicle disclosed herein. Therefore, the corresponding embodiments of the method will not be described again in this specification.

The following figure descriptions describe some specific embodiments of this disclosure for illustrative purposes.

FIG. 1 illustrates a schematic side view a motor vehicle with a sensor arrangement according to some embodiments.

Figure 2:
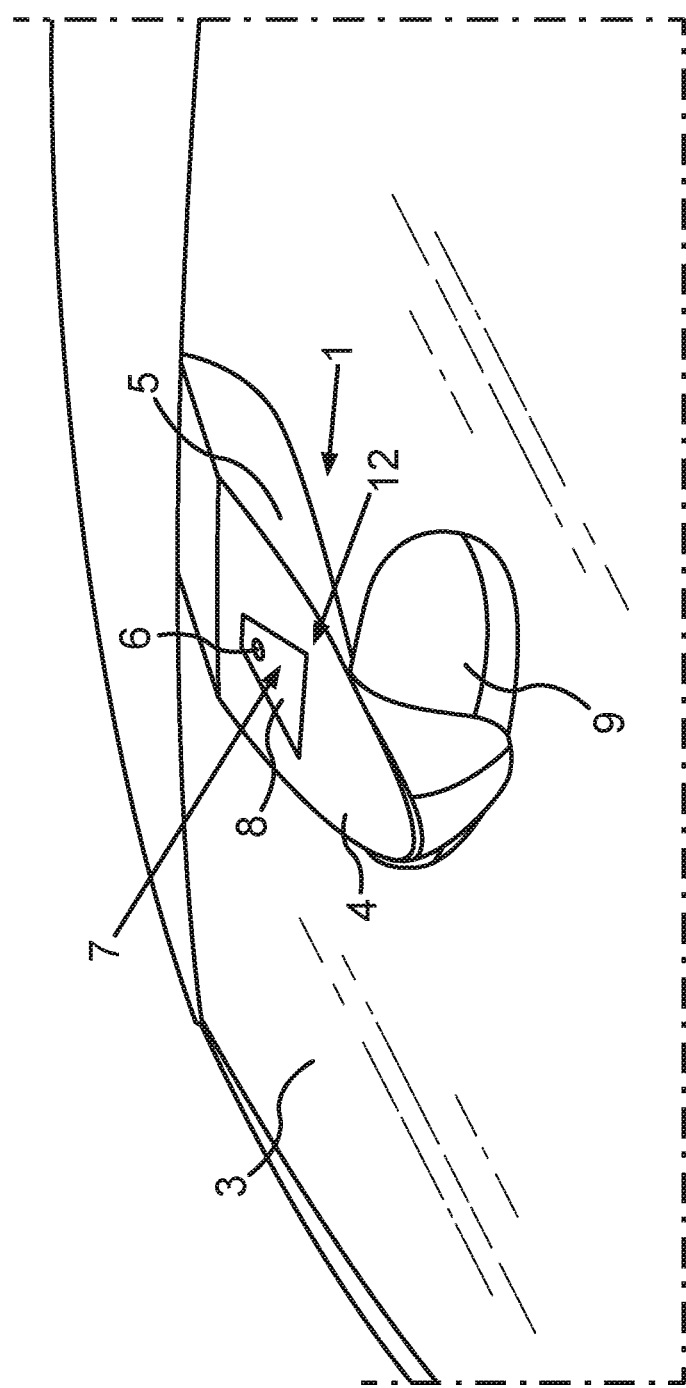
FIG. 2 illustrates a schematic perspective view of the sensor arrangement, according to some embodiments.

FIG. 2 illustrates a schematic perspective view of the sensor arrangement, according to some embodiments.

The embodiments described in the following paragraphs may be preferred embodiments. In the embodiments, the described components of the embodiments are each individual features of this disclosure, to be viewed independently from one another. The individual features also may develop embodiments independently from one another. The individual features in one embodiment are thus also to be viewed as components of the invention either individually or in a combination different from another described embodiment. Furthermore, the described embodiments can also be supplemented by the features within other embodiments already described.

Functionally identical elements in the drawings are each denoted with the same reference sign.

FIG. 1 illustrates a motor vehicle 2 with a sensor arrangement 1. The sensor arrangement 1 comprises a pane 3 and a sensor housing 5 with an optical sensor 6. The sensor housing 5 is arranged on one side 13 of the pane 3 and together with the pane 3 forms a gap 11. In this case, the side 13 of the pane 3 is, relative to the motor vehicle 2, an inner side of the pane 3. The optical sensor 6 is arranged on the gap 11. In the present case, the pane 3 is designed as a front window or windshield of the motor vehicle 2. In other embodiments not shown in the drawing, the pane 3 can form any other pane, for example, a side window or a rear window.

In the present case, a rearview mirror 9 of the motor vehicle 2 is additionally arranged on the sensor housing 5. Therefore, the sensor housing 5 in the present case is designed multifunctionally in the manner of a panel. For example, the sensor housing 5 can alternatively or additionally have control elements, lighting elements, and/or compartments for providing storage space.

The optical sensor 6 is, for example, a camera, a Lidar sensor, or an infrared sensor. An optical signal 10, for example, visible light, infrared radiation, or a reflected laser beam, impinges through the pane 3 onto the optical sensor 6. The optical sensor 6 is designed particularly to detect the optical signal 10. Due to the formation of ice, particularly on an outer side of the pane 3, or condensation on the pane 3, particularly on the side 13 in the area of the optical sensor 6, the functionality of the optical sensor 6 could be impaired. For example, the optical signal 10 could be distorted or prevented from transmitting to the optical sensor 6.

By means of a blower 21 of the motor vehicle 2, the pane 3 can be freed from ice and condensation. In particular, the blower 21 is provided with heated air 23 from a heating device 22, for example, an independent vehicle heater or a heat exchanger, which is connected to a coolant of an engine (not shown) of the motor vehicle. Due to the sensor housing 5, air from an interior 20 of the motor vehicle 2 cannot circulate in an area 12, in which the sensor housing 5 is arranged on the pane 3. As a result, the pane 3 cannot be heated in the area 12 by the heated air 23 in the interior 20 of the motor vehicle 2. In particular, the pane 3 cannot be deiced in the area 12 by the blower 21. However, a deicing of the pane 3 is particularly important precisely in the area 12 to ensure the functionality of the optical sensor 6.

To make the area 12 of the pane 3 heatable by means of the heated air 23, the sensor arrangement 1 has a heat conducting element 4. The heat conducting element 4 is arranged on the side 13, in the present case on the inner side, of the pane 3. In particular, the heat conducting element 4 is arranged between the pane 3 and the sensor housing 5. The heat conducting element 4 allows for a conduction of heat from the interior 20 to the area 12 of the pane 3. In particular, the heat conducting element 4 allows for a heat conduction of the heated air 23 toward the area 12 of the pane 3. As a result, the area 12 of the pane 3, in which the sensor housing 5 prevents the air circulation, can, due to the heat conducting element 4, still be heated indirectly by the heated air 23 or the heating device 22. The heating device 22 is designed particularly for heating the blower 21.

FIG. 2 illustrates particularly well the arrangement of the heat conducting element 4 between pane 3 and sensor housing 5. The heat conducting element 4 has a recess that is not covered by the heat conducting element 4. The recess of the heat conducting element 4 forms an entry surface 7, through which the optical signal 10 impinges onto the optical sensor 6. In the present case, the entry surface 7 is not covered by the heat conducting element 4.

In the present case, revisiting FIG. 1, the gap 11 is completely sealed by the sensor housing 5, the pane 3, and the heat conducting element 4. Therefore, no dirt and no moisture from the interior 20 can penetrate the gap 11. As a result, condensation of the pane 3 at the gap 11 can be effectively prevented. In addition, contamination of the optical sensor 6 can be prevented.

The heat conducting element 4 is designed to be non-transparent and opaque. Therefore, the optical signal 10 and/or visible light cannot pass through the heat conducting element 4. As a result, a detection range of the optical sensor 6 can be predetermined by position, location, and size of the heat conducting element 4. In addition, electronics and/or sensors, as well as irregular clearances on the sensor housing 5, can be covered up. As a result, an optical enhancement of the motor vehicle 2 can be achieved. The heat conducting element 4 thus has a plurality of different functions.

Returning to FIG. 2, at the entry surface 7, a further, transparent heat conducting element 8 can be arranged. For example, the further heat conducting element 8 is a thin metal layer, particularly silver, which is transparent for visible light and/or the optical signal 10. As a result, the area 12 of the pane 3 can be heated particularly well and thus be deiced.

For example, the heat conducting element 4 is applied by means of thermal evaporation to the side 13 of the pane 3. A material, from which the heat conducting element 4 is formed, has a higher heat conductivity than a material from which the pane 3 is formed. The pane 3 is preferably made from a glass. The heat conducting element 4 is preferably, at least to some extent, made from a metal. For example, the heat conducting element 4 is formed by a metal layer, particularly a silver layer, which is applied to the pane 3 by means of thermal evaporation. Alternatively or additionally, the heat conducting element 4 can comprise a heat-conducting foil. The heat conducting element 4 does not have to be designed so as to be planar, as in the present case, but can be formed by a plurality of heat-conducting strips that are arranged between pane 3 and sensor housing 5. Finally, it can be provided that a coating, which is known from prior art for coating the pane 3, is adjusted by the addition of particles of high heat conductivity, particularly higher conductivity than the coating itself and/or the pane 3, for an intended purpose as the heat conducting element 4. In such case, the heat conducting element 4 can be formed by the coating in conjunction with the particles.

Overall, the examples demonstrate how a deicing of the pane 3 in an area 12 of the sensor housing 5 can be made possible by the particularly simple and cost-effective embodiments disclosed herein. In particular, no active elements, for example, heating elements, are required on the sensor arrangement 1. By activating an independent vehicle heater as a heating device 22, the ice-free condition of the pane 3 can be ensured particularly early prior to departure.

The invention claimed is:

1. A sensor arrangement for a motor vehicle, comprising:
    a pane;
    an optical sensor;
    a sensor housing disposed on an inner side of the pane such that a gap is formed between the sensor housing and the inner side of the pane, and wherein the optical sensor is disposed in the gap; and
    a heat conductor disposed between the sensor housing and the inner side of the pane, the heat conductor configured to conduct heat from between an outside of the sensor housing and the pane,
    wherein the heat conductor is disposed both inside and outside the gap, the heat conductor projecting into an interior of the motor vehicle to thereby be heated by heated air in the interior.

2. The sensor arrangement of claim 1, wherein the heat conductor comprises a material having a greater thermal conduction coefficient than a thermal conduction coefficient of the pane.

3. The sensor arrangement of claim 2, wherein the material is metal.

4. The sensor arrangement of claim 1, wherein the heat conductor is configured to be non-transparent.

5. The sensor arrangement of claim 1, wherein the heat conductor is configured as a privacy screen that at least partially prevents a view through the pane.

6. The sensor arrangement of claim 1, wherein the heat conductor is applied to the inner side of the pane by means of thermal evaporation.

7. The sensor arrangement of claim 1, wherein the gap is a sealed gap formed by the sensor housing, the pane, and the heat conductor, wherein no air exchange between the gap and an area outside of the sensor housing takes place.

8. The sensor arrangement of claim 1, wherein the optical sensor is configured to detect an optical signal that impinges through an entry surface of the pane onto the optical sensor.

9. The sensor arrangement of claim 8, wherein the entry surface is formed by a recess of the heat conductor.

10. The sensor arrangement of claim 8, wherein the entry surface is configured with a second heat conductor that is transparent.

11. A motor vehicle with a sensor arrangement, wherein the sensor arrangement comprises:
a pane;
an optical sensor;
a sensor housing disposed with the optical sensor on an inner side of the pane of the motor vehicle, wherein the sensor housing is further disposed to form a gap on the inner side of the pane between the sensor housing and the pane, and wherein the optical sensor is disposed within the gap; and
a heat conductor disposed between the sensor housing and the inner side of the pane, the heat conductor configured to conduct heat from outside the sensor housing to an area between the sensor housing and the pane,
wherein the heat conductor is disposed both inside and outside the gap, the heat conductor projecting into an interior of the motor vehicle to thereby be heated by heated air in the interior.

12. The motor vehicle of claim 11, wherein the pane is a windshield of the motor vehicle.

13. The motor vehicle of claim 11, wherein the pane is a rear window of the motor vehicle.

14. The motor vehicle of claim 11, wherein the optical sensor comprises a camera, a Lidar sensor, or an infrared sensor.

15. A method for operating a sensor arrangement for a motor vehicle, the method comprising:
conducting heat, by a heat conductor, from an interior of the motor vehicle to an area of a pane between a sensor housing of the sensor arrangement and the pane, wherein the sensor housing is disposed on an inner side of the pane so as to form a gap between the sensor housing and the pane, in which an optical sensor is disposed; and
heating, by the heat conductor, the area of the pane,
wherein the heat conductor is disposed both inside and outside the gap, the heat conductor projecting into the interior of the motor vehicle to thereby be heated by heated air in the interior.

16. The method of claim 15, further comprising:
deicing the area of the pane by the heating of the area of the pane.

17. The method of claim 15, wherein the heat conductor is a passive heat conductor that conducts heat generated from a heat source of the motor vehicle.

18. The method of claim 15, wherein the pane is a windshield of the motor vehicle.

19. The method of claim 15, wherein the pane is a rear window of the motor vehicle.

20. The sensor arrangement of claim 1, wherein the heat conductor is independent of power sources of the motor vehicle.

* * * * *